(12) United States Patent
Moulton (10) Patent No.: US 11,318,915 B2
(45) Date of Patent: May 3, 2022

(54) FLEXIBLE MAGNETIC CLEANING DEVICE FOR AUTOMOBILE WINDOWS

(71) Applicant: John Moulton, New Smyrna Beach, FL (US)

(72) Inventor: John Moulton, New Smyrna Beach, FL (US)

( * ) Notice: Subject to any disclaimer, the term of this patent is extended or adjusted under 35 U.S.C. 154(b) by 0 days.

(21) Appl. No.: 17/028,575

(22) Filed: Sep. 22, 2020

(65) Prior Publication Data

US 2021/0101567 A1 Apr. 8, 2021

Related U.S. Application Data

(60) Provisional application No. 62/909,390, filed on Oct. 2, 2019.

(51) Int. Cl.
*B60S 3/04* (2006.01)
*A47L 1/15* (2006.01)
*B08B 1/00* (2006.01)
*A47L 1/13* (2006.01)
*A47L 1/12* (2006.01)

(52) U.S. Cl.
CPC ............ *B60S 3/045* (2013.01); *A47L 1/12* (2013.01); *A47L 1/13* (2013.01); *A47L 1/15* (2013.01); *B08B 1/006* (2013.01)

(58) Field of Classification Search
CPC ..... A47L 1/12; A47L 1/13; A47L 1/15; A47L 1/09; B08B 1/006; B60S 3/045
USPC ............................................. 15/236.02, 220.2
See application file for complete search history.

(56) References Cited

U.S. PATENT DOCUMENTS 8,151,401 B2 * 4/2012 Cheyne ................ A47L 1/09
15/220.2
9,340,184 B1 * 5/2016 Morris .................. B60S 3/048

FOREIGN PATENT DOCUMENTS

KR 100845742 B1 * 7/2008 ............ A47L 1/12

* cited by examiner

*Primary Examiner* — Katina N. Henson (57) ABSTRACT

The present invention is a flexible magnetic cleaning apparatus. Once installed, the flexible magnetic cleaning apparatus conforms to the curvature of a windshield, providing sufficient cleaning contact along the windshield. The flexible magnetic cleaning apparatus contains a cleaning paddle and a handle. The cleaning paddle contains a pad connection joint, at least one pad, at least one magnet, and a cleaning layer. The at least one pad is connected to and distributed about the pad connection joint. The handle is positioned adjacent to the pad connection joint opposite to the at least one pad. Each of the at least one magnet is positioned within one of the at least one pad. The cleaning layer is attached adjacent to the at least one pad opposite to the pad connection joint. This optimizes the cleaning process compared to cleaning implements that do not conform to the cleaning surface.

13 Claims, 7 Drawing Sheets

FLEXIBLE MAGNETIC CLEANING DEVICE FOR AUTOMOBILE WINDOWS

The current application claims a priority to the U.S. Provisional Patent application Ser. No. 62/909,390 filed on Oct. 2, 2019.

FIELD OF THE INVENTION

The present invention relates generally to a cleaning device for automobile windows. More specifically, the present invention relates to a cleaning device that adapts to the curved surface of an automobile window.

BACKGROUND OF THE INVENTION

Keeping the windshield of a vehicle to maintain good visibility is important for driving. However, despite the importance of having a clean windshield, there have not been any solution available on the market that efficiently cleans the windshield of a vehicle. One possible option that has been developed recently are pairs of cleaning paddles with each paddle being embedded with magnets. The cleaning paddles allow a user to clean both sides of the windshield of a car simultaneously. However, one flaw of cleaning paddles is that they cannot adapt to the contours of the windshield and the interior paddle will fall off when the distance between the two paddles is too big. Therefore, it is an objective of the present invention to solve these problems and limitations.

The present invention solves these problems and limitations. The present invention is a cleaning device that can adapt to the contours of the windshield of an automobile. The present invention is made of a pair of paddles and each paddle can adapt to the contours of the windshield. The adaptation to the contours of the windshield by the paddles prevent the interior paddle from falling off while the exterior paddle is being pushed across the windshield.

SUMMARY OF THE INVENTION

The present invention is a flexible magnetic cleaning apparatus. The flexible magnetic cleaning apparatus comprises a cleaning paddle and a handle. The cleaning paddle comprises a pad connection joint, at least one pad, at least one magnet, and a cleaning layer. The at least one pad is connected to and distributed about the pad connection joint. The handle is positioned adjacent to the pad connection joint opposite to the at least one pad. Each of the at least one magnet is positioned within one of the at least one pad. The cleaning layer is attached adjacent to the at least one pad opposite to the pad connection joint. Once installed, the flexible magnetic cleaning apparatus conforms to the curvature of a cleaning surface, providing sufficient cleaning contact along the cleaning surface. This optimizes the cleaning process compared to cleaning implements that do not conform to the cleaning surface. In the preferred embodiment of the present invention, the flexible magnetic cleaning apparatus is scaled to fit in a vehicle compartment, such as a glovebox or console, but may be scaled to any size. The handle allows the user to grasp and move the flexible magnetic cleaning apparatus. The cleaning paddle serves as the active cleaning component that secures along the outside and inside portions of the cleaning surface. In the preferred embodiment of the present invention, the pad connection joint may take the form of an elastomeric joint made out of any suitable material such as, but not limited to rubber or any other rigid elastomeric material. The at least one pad may take the form of a series of interconnected rigid pads that mounts the cleaning layer. In the preferred embodiment of the present invention, the cleaning layer may take the form of a cleaning fabric that directly contacts the cleaning surface. The cleaning layer may take the form of a microfiber cloth but may take the form of any other suitable material.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a flexible magnetic cleaning apparatus 1, as shown in FIGS. 1-5. The flexible magnetic cleaning apparatus 1 comprises a cleaning paddle 11 and a handle 12. The cleaning paddle 11 comprises a pad connection joint 111, at least one pad 113, at least one magnet 115, and a cleaning layer 116. The at least one pad 113 is connected to and distributed about the pad connection joint 111. The handle 12 is positioned adjacent to the pad connection joint 111 opposite to the at least one pad 113. Each of the at least one magnet 115 is positioned within one of the at least one pad 113. The cleaning layer 116 is attached adjacent to the at least one pad 113 opposite to the pad connection joint 111. Once installed, the flexible magnetic cleaning apparatus 1 conforms to the curvature of a cleaning surface 2, providing sufficient cleaning contact along the cleaning surface 2. This optimizes the cleaning process compared to cleaning implements that do not conform to the cleaning surface 2. In the preferred embodiment of the present invention, the cleaning surface 2 may take the form of a vehicle windshield, but may take the form of any other suitable window surface, such as, but not limited to curve window glass, rear view windows, or any other suitable window surface In the preferred embodiment of the present invention, the flexible magnetic cleaning apparatus 1 is scaled to fit in a vehicle compartment, such as a glovebox or console, but may be scaled to any size. The handle 12 allows the user to grasp and move the flexible magnetic cleaning apparatus 1. The cleaning paddle 11 serves as the active cleaning component that secures along the outside and inside portions of the cleaning surface 2. In the preferred embodiment of the present invention, the pad connection joint 111 may take the form of an elastomeric joint made out of any suitable material such as, but not limited to rubber, or any other rigid elastomeric material. The at least one pad 113 may take the form of rigid pad that mounts the cleaning layer 116. In the preferred embodiment of the present invention, the cleaning layer 116 may take the form of a cleaning fabric that directly contacts the cleaning surface 2. The cleaning layer 116 may take the form of a microfiber cloth but may take the form of any other suitable material. In the preferred embodiment of the present invention, the pad connection joint 111 is made out of a flexible material. In the preferred embodiment of the present invention, the at least one pad 113 is made out of a thin sheet. In the preferred embodiment of the present invention, the handle 12 comprises a handle cover 124. The handle cover 124 is removably attached on the handle 12. In the preferred embodiment of the present invention, the pad connection joint 111 is connected to the at least one pad 113, such that they form one molded piece.

Figure 4:
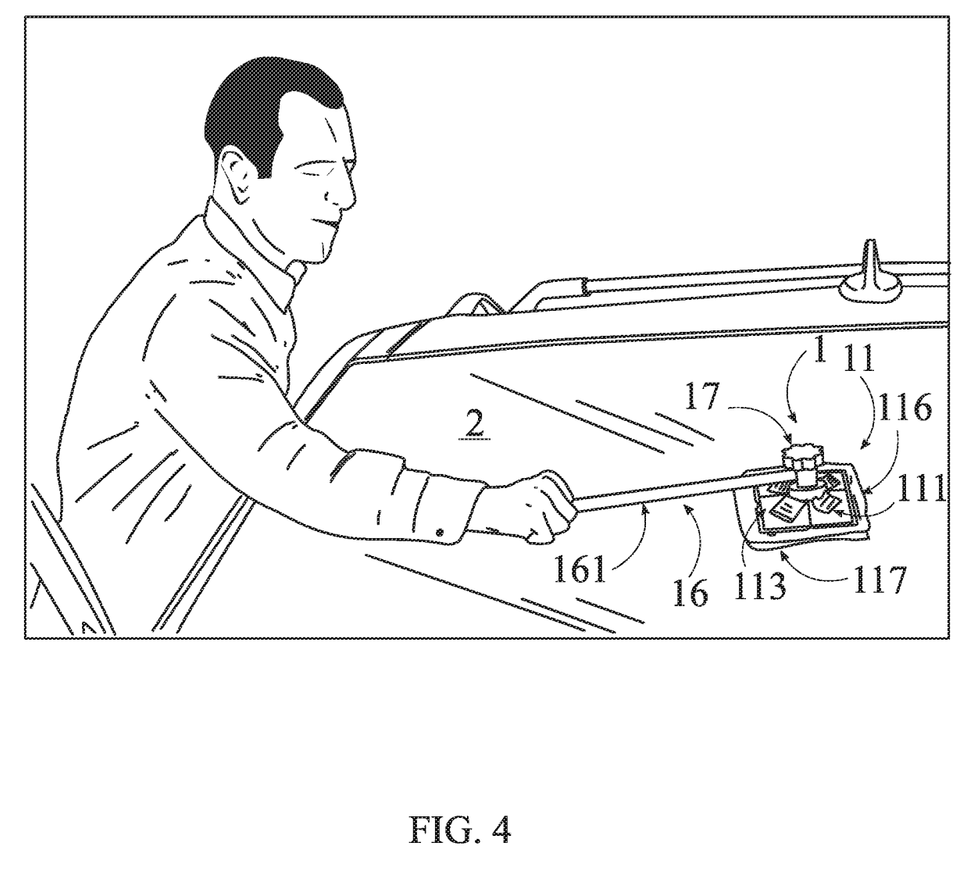
FIG. 4 is an illustration of the present invention that shows the user wiping the present invention with the attached extension pole along a car windshield.
Figure 5:
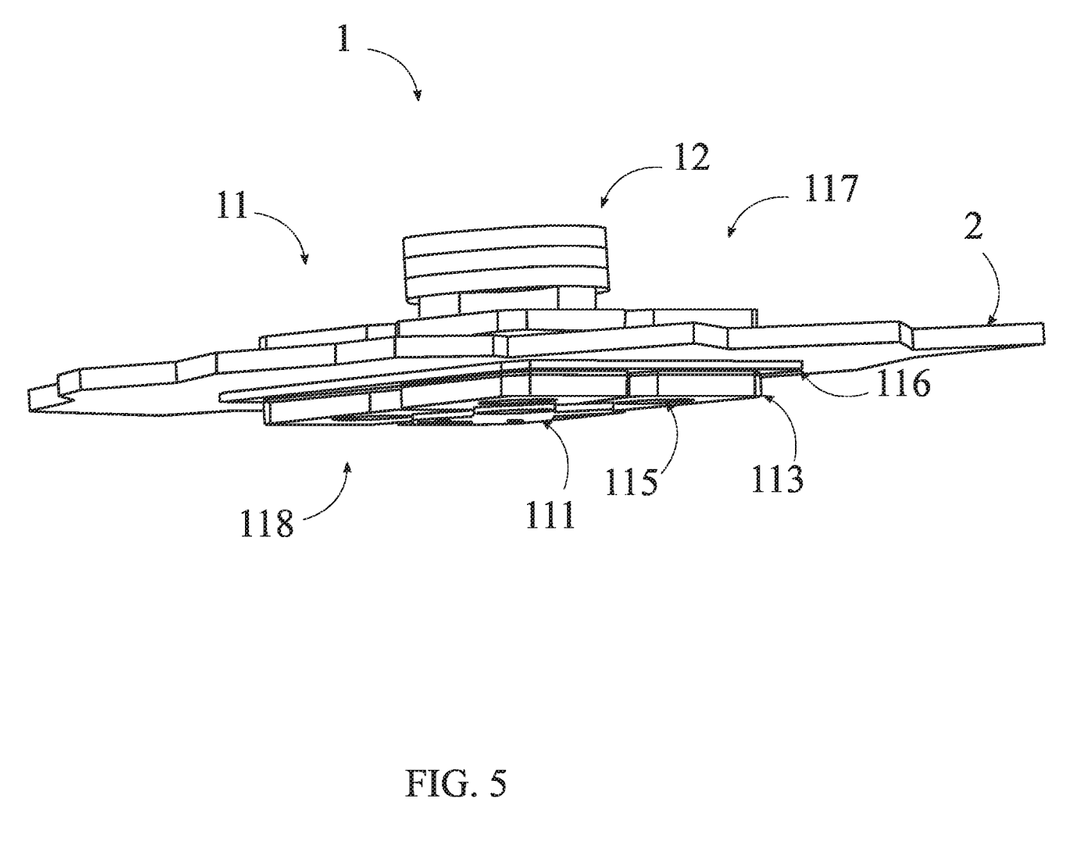
FIG. 5 is an illustration of the present invention that shows a side perspective of the present invention installed along a windshield surface.

In the preferred embodiment of the present invention, the cleaning paddle 11 comprises a first half 117 and a second half 118, as shown in FIG. 5. In reference to FIGS. 1-5, the first half 117 and the second half 118 each comprises a pad connection joint 111, at least one pad 113, at least one magnet 115, and a cleaning layer 116. The first half 117 and the second half 118 are magnetically attached to each other along a cleaning surface 2, as shown in FIG. 5. In the preferred embodiment of the present invention, the first half 117 serves as the user handling side of the cleaning paddle 11. In the preferred embodiment of the present invention, the second half 118 serves as anchoring side of the cleaning paddle 11, such that the second half 118 is magnetically attached opposite to the first half 117 along the cleaning surface 2. This allows inside and outside cleaning of the cleaning surface 2.

Figure 6:
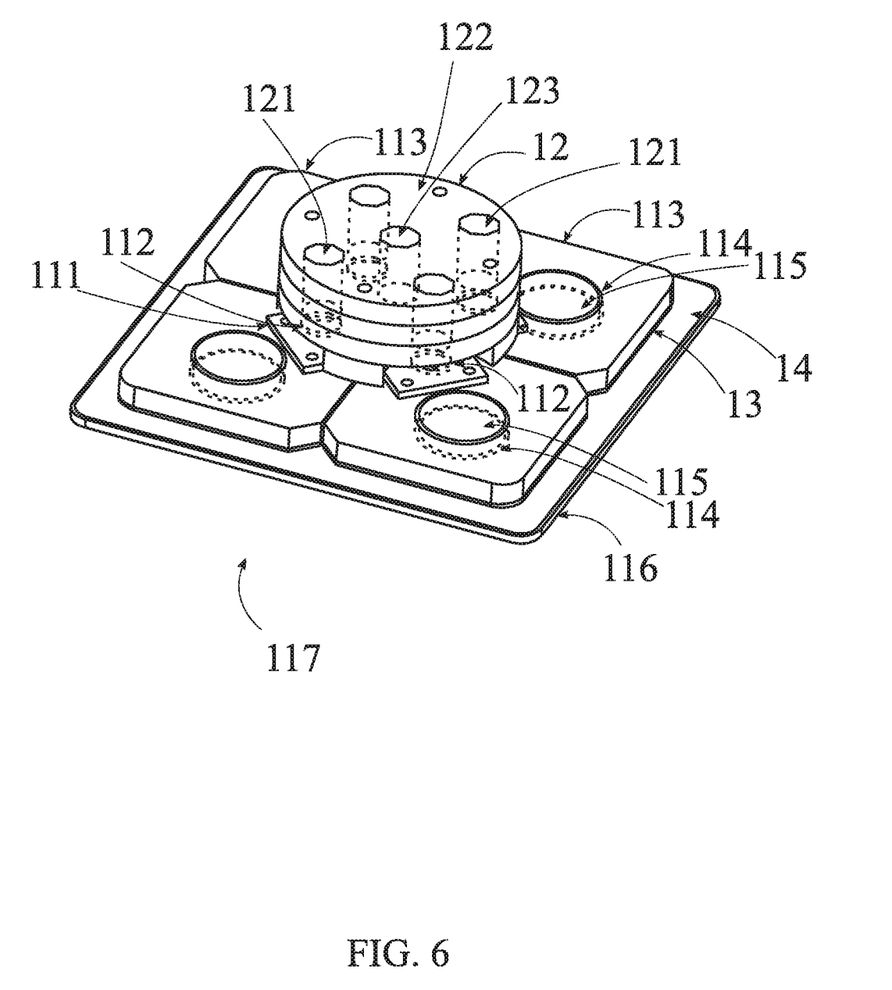
FIG. 6 is an illustration of the present invention that shows one portion of a cleaning paddle.
Figure 7:
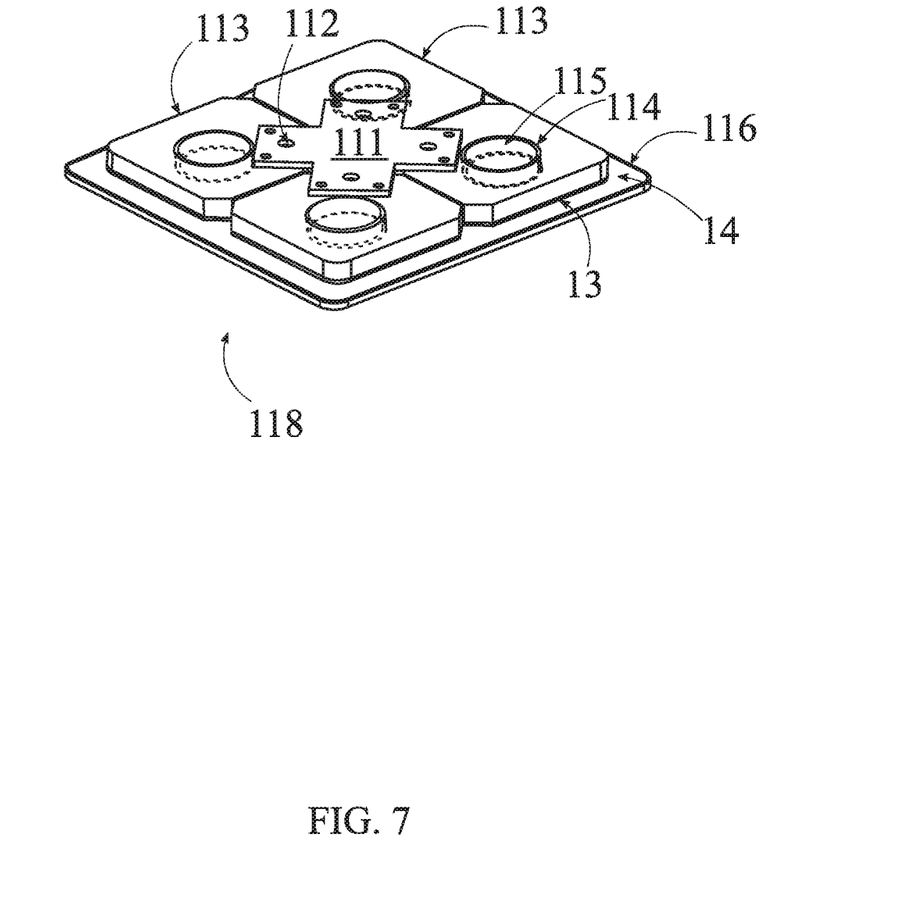
FIG. 7 is an illustration of the present invention that shows the other portion of the cleaning paddle.

In the preferred embodiment of the present invention, each of the at least one pad 113 comprises a mounting recess 114, as shown in FIGS. 6-7. At least one magnet 115 is embedded within each of the mounting recesses 114. In the preferred embodiment of the present invention, the flexible magnetic cleaning apparatus 1 further comprises a first fastener backing 13 and a second fastener backing 14, as shown in FIGS. 6-7. The first fastener backing 13 is connected adjacent to the at least one pad 113, opposite to the handle 12. The second fastener backing 14 is connected adjacent to the cleaning layer 116 and the first fastener backing 13 is removably attached adjacent to the second fastener backing 14. In the preferred embodiment of the present invention the first fastener backing 13 and the second fastener backing 14 may take the form of a hook and loop fastener. In various embodiments, the first fastener backing 13 and the second fastener backing 14 may take the form of any other suitable fastener implement, such as, but not limited to fastening tabs, clips, magnets, or any other suitable fastener implement. In the preferred embodiment of the present invention, the cleaning layer 116 integrates the second fastener backing 13 such that the cleaning layer 116 removably attaches to the first fastener backing 14 positioned along the at least one pad 113.

Figure 1:
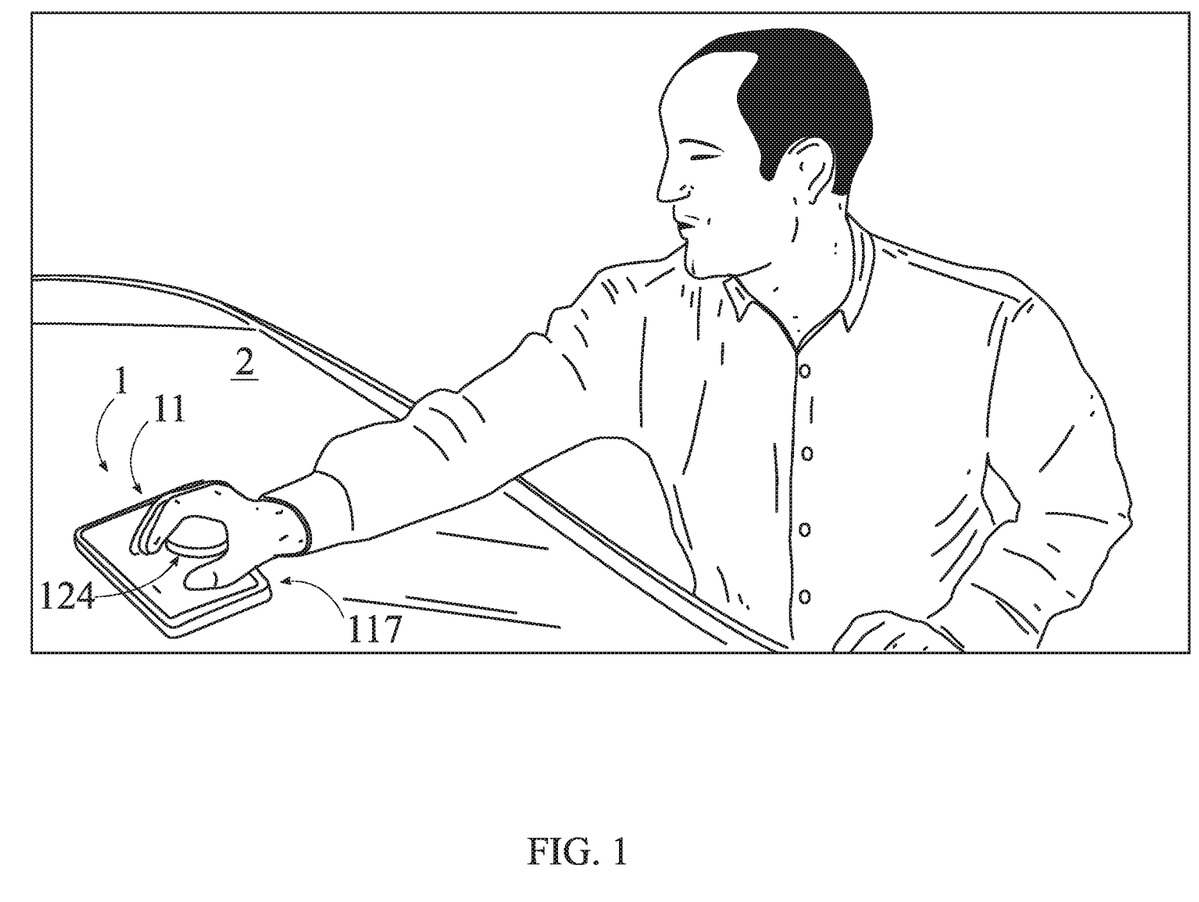
FIG. 1 is an illustration of the present invention that shows a user wiping the present invention along a car windshield.
Figure 2:
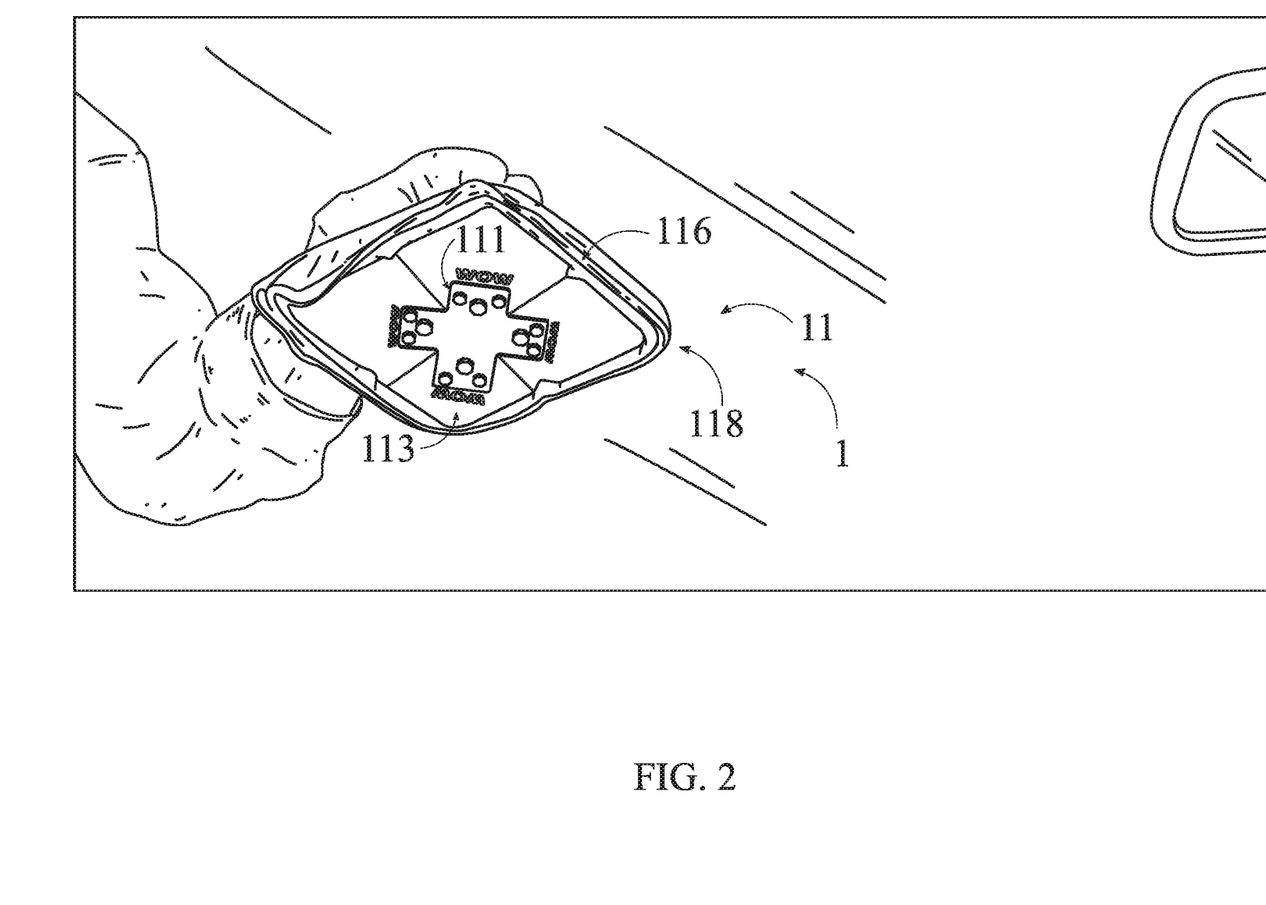
FIG. 2 is an illustration of the present invention that shows the user wiping the present invention the car windshield on the other side.
Figure 3:
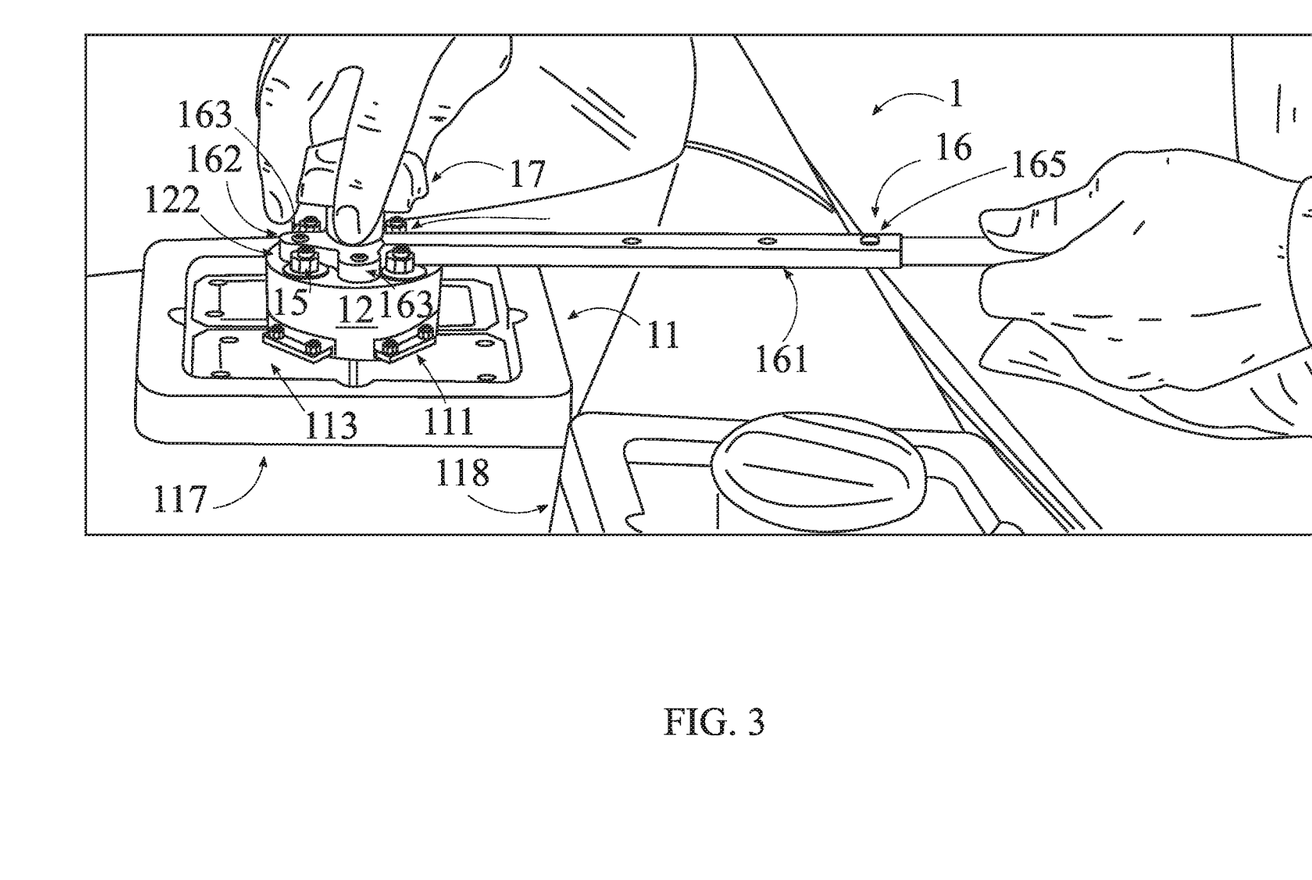
FIG. 3 is an illustration of the present invention that shows an extension pole installed onto the present invention.

In the preferred embodiment of the present invention, the flexible magnetic cleaning apparatus 1 further comprises a plurality of mounting bolts 15, as shown in FIG. 3. The handle 12 comprises a plurality of first mounting apertures 121, as shown in FIG. 6. The pad connection joint 111 comprises a plurality of second mounting apertures 112, as shown in FIGS. 6-7. The plurality of first mounting apertures 121 is distributed about the handle 12 according to a specified pattern. The plurality of second mounting apertures 112 is distributed about the pad connection joint 111 according to the specified pattern. The plurality of first mounting apertures 121 is concentrically aligned with the plurality of second mounting apertures 112. The plurality of mounting bolts 15 traverses through the plurality of first mounting apertures 121 and the plurality of second mounting apertures 112.

In the preferred embodiment of the present invention, the handle 12 further comprises a mounting surface 122, as shown in FIGS. 3 and 6. The flexible magnetic cleaning apparatus 1 further comprises an extension pole 16, as shown in FIGS. 3-4. The mounting surface 122 is positioned opposite to the pad connection joint 111 along the handle 12. The extension pole 16 is removably attached adjacent to the mounting surface 122. The extension pole 16 extends the reach of the flexible magnetic cleaning apparatus 1, such that it allows the user to thoroughly clean the cleaning surface 2. In the preferred embodiment of the present invention, the flexible magnetic cleaning apparatus 1 further comprises a mounting fastener 17 and a plurality of mounting bolts 15, as shown in FIGS. 3-4. The handle 12 further comprises a plurality of first mounting apertures 121 and a third mounting aperture 123, as shown in FIG. 6. The extension pole 16 comprises a pole body 161, a handle connection bracket 162, and a pole mounting aperture 164, as shown in FIG. 3. The plurality of first mounting apertures 121 is distributed about the handle 12 according to a specified pattern. The third mounting aperture 123 traverses through the handle 12. The pole body 161 is positioned terminally adjacent to the handle connection bracket 162. The pole mounting aperture 164 traverses through the handle connection bracket 162. The mounting fastener 17 is removably positioned within the pole mounting aperture 164 and the third mounting aperture 123. In the preferred embodiment of the present invention, the handle connection bracket 162 comprises a plurality of locking portions 163, as shown in FIG. 3. The plurality of locking portions 163 is positioned between the plurality of mounting bolts 15. In another embodiment, the extension pole 16 further comprises a telescopic mechanism 165. The telescopic mechanism 165 is positioned along the extension pole 16, where the extension pole 16 is adjustable in length through the telescopic mechanism 165.

Although the invention has been explained in relation to its preferred embodiment, it is to be understood that many other possible modifications and variations can be made without departing from the spirit and scope of the invention as hereinafter claimed.

What is claimed is:
1. A flexible magnetic cleaning apparatus comprising:
a cleaning paddle;
a handle;
an extension pole;
a mounting fastener;
a plurality of mounting bolts;

the cleaning paddle comprising a first half and a second half;

the first half comprising a first pad connection joint, at least one first pad, at least one first magnet, and a first cleaning layer;

the second half comprising a second pad connection joint, at least one second pad, at least one second magnet, and a second cleaning layer;

the first half and the second half being magnetically attached to each other along a cleaning surface;

the at least one first pad being connected to and distributed about the first pad connection joint;

the handle being positioned adjacent to the first pad connection joint opposite to the at least one first pad;

the at least one first magnet being positioned within the at least one first pad;

the at least one second magnet being positioned within the at least one second pad;

the first cleaning layer being attached adjacent to the at least one first pad opposite to the first pad connection joint;

the second cleaning layer being attached adjacent to the at least one second pad opposite to the second pad connection joint;

the handle comprising a mounting surface;

the mounting surface being positioned opposite to the first pad connection joint along the handle;

the extension pole being removably attached adjacent to the mounting surface;

the handle further comprising a plurality of first mounting apertures and a third mounting aperture;

the extension pole comprising a pole body, a handle connection bracket, and a pole mounting aperture;

the plurality of first mounting apertures being distributed about the handle according to a specified pattern;

the third mounting aperture traversing through the handle;

the pole body being positioned terminally adjacent to the handle connection bracket;

the pole mounting aperture traversing through the handle connection bracket; and the mounting fastener being removably positioned within the pole mounting aperture and the third mounting aperture.

2. The flexible magnetic cleaning apparatus as claimed in claim 1 comprising:

each of the at least one first pad comprising a mounting recess; and the at least one first magnet being embedded within each of the mounting recesses.

3. The flexible magnetic cleaning apparatus as claimed in claim 1 comprising:

the first half of the cleaning paddle comprising a first fastener backing and a second fastener backing;

the first fastener backing being connected adjacent to the at least one first pad, opposite to the handle;

the second fastener backing being connected adjacent to the first cleaning layer; and the first fastener backing being removably attached adjacent to the second fastener backing.

4. The flexible magnetic cleaning apparatus as claimed in claim 3, wherein the first fastener backing and the second fastener backing formed a hook and loop type fastener.

5. The flexible magnetic cleaning apparatus as claimed in claim 1 comprising:

the first pad connection joint comprising a plurality of second mounting apertures;

the plurality of second mounting apertures being distributed about the first pad connection joint according to the specified pattern;

the plurality of first mounting apertures being concentrically aligned with the plurality of second mounting apertures; and the plurality of mounting bolts traversing through the plurality of first mounting apertures and the plurality of second mounting apertures.

6. The flexible magnetic cleaning apparatus as claimed in claim 1, comprising:

the extension pole further comprising a telescopic mechanism; and the telescopic mechanism being positioned along the extension pole, wherein the extension pole is adjustable in length through the telescopic mechanism.

7. The flexible magnetic cleaning apparatus as claimed in claim 1 comprising:

the handle comprising a handle cover; and the handle cover being removably attached on the handle.

8. The flexible magnetic cleaning apparatus as claimed in claim 1, comprising:

the handle connection bracket comprising a plurality of locking portions; and the plurality of locking portions being positioned between the plurality of mounting bolts.

9. The flexible magnetic cleaning apparatus as claimed in claim 1, wherein the first pad connection joint and the second pad connection joint are made out of a flexible material.

10. The flexible magnetic cleaning apparatus as claimed in claim 1, wherein the at least one first pad and the at least one second pad are made out of a thin sheet.

11. The flexible magnetic cleaning apparatus as claimed in claim 1 comprising:

the second half of the cleaning paddle comprising a first fastener backing and a second fastener backing;

the first fastener backing being connected adjacent to the at least one second pad;

the second fastener backing being connected adjacent to the second cleaning layer; and the first fastener backing being removably attached adjacent to the second fastener backing.

12. The flexible magnetic cleaning apparatus as claimed in claim 11, wherein the first fastener backing and the second fastener backing formed a hook and loop type fastener.

13. The flexible magnetic cleaning apparatus as claimed in claim 1 comprising:

each of the at least one second pad comprising a mounting recess; and the at least one second magnet being embedded within each of the mounting recesses.

* * * * *